United States Patent
Dyer

(10) Patent No.: US 11,491,421 B2
(45) Date of Patent: Nov. 8, 2022

(54) VALVE CONTROLLED VACUUM SYSTEM

(71) Applicant: Hamilton Sundstrand Corporation, Charlotte, NC (US)

(72) Inventor: Gerald P. Dyer, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 455 days.

(21) Appl. No.: 15/877,025

(22) Filed: Jan. 22, 2018

(65) Prior Publication Data
US 2019/0224589 A1    Jul. 25, 2019

(51) Int. Cl.
| | |
|---|---|
| *B01D 19/00* | (2006.01) |
| *B64D 37/00* | (2006.01) |
| *B64D 37/32* | (2006.01) |
| *F04B 39/00* | (2006.01) |
| *B64D 37/34* | (2006.01) |
| *F04B 9/12* | (2006.01) |

(Continued)

(52) U.S. Cl.
CPC ..... *B01D 19/0063* (2013.01); *B01D 19/0005* (2013.01); *B01D 19/0036* (2013.01); *B64D 37/005* (2013.01); *B64D 37/32* (2013.01); *B64D 37/34* (2013.01); *F04B 9/1215* (2013.01); *F04B 25/02* (2013.01); *F04B 39/0016* (2013.01); *B01D 2053/224* (2013.01); *B01D 2256/10* (2013.01); *B01D 2257/104* (2013.01); *B01D 2313/10* (2013.01); *B01D 2313/12* (2013.01); *B01D 2313/21* (2013.01); *B01D 2313/38* (2013.01); *B64D 2013/0677* (2013.01); *F23K 2900/05082* (2013.01)

(58) Field of Classification Search
CPC ...... B01D 19/00; B01D 19/0042; E03D 1/00; F02M 33/02; F04B 35/00
See application file for complete search history.

(56) References Cited

U.S. PATENT DOCUMENTS

| | | |
|---|---|---|
| 3,620,652 A | 11/1971 | Alphons et al. |
| 3,888,274 A | 6/1975 | Weston |

(Continued)

FOREIGN PATENT DOCUMENTS

| | | |
|---|---|---|
| DE | 222892 C | 6/1910 |
| DE | 10041555 A1 | 3/2002 |

(Continued)

OTHER PUBLICATIONS

European Search Report for Application No. 18189721.6-1010, dated Dec. 4, 2018, 10 pages.

(Continued)

*Primary Examiner* — Youngsul Jeong
(74) *Attorney, Agent, or Firm* — Cantor Colburn LLP

(57) ABSTRACT

A vacuum system for use with a deoxygenator system includes a housing, a movable assembly positioned within the housing, and a biasing mechanism coupling the movable assembly to the housing. The movable assembly is movable between a first position and a second position within the housing to form a low pressure area between the housing and the movable assembly. A control system including at least one pressure source is arranged in fluid communication with the low pressure area. The control system is operable to selectively communicate fluid from the at least one pressure source to the housing to form the low pressure area.

15 Claims, 8 Drawing Sheets

(51) Int. Cl.
*F04B 25/02* (2006.01)
*B64D 13/06* (2006.01)
*B01D 53/22* (2006.01)

(56) References Cited

U.S. PATENT DOCUMENTS

| | | | |
|---|---|---|---|
| 4,102,609 | A | 7/1978 | Wood |
| 4,391,184 | A | 7/1983 | Yamane et al. |
| 4,524,793 | A * | 6/1985 | Silverwater .......... F15B 21/044 137/183 |
| 5,299,917 | A | 4/1994 | Schultz |
| 5,494,410 | A | 2/1996 | Maier-Laxhuber et al. |
| 6,315,815 | B1 | 11/2001 | Spadaccini et al. |
| 6,494,938 | B2 * | 12/2002 | Sims .................. B01D 19/0031 96/10 |
| 7,569,099 | B2 | 8/2009 | Coffin |
| 8,177,884 | B2 | 5/2012 | Schmidt et al. |
| 8,291,928 | B2 | 10/2012 | Reid et al. |
| 8,679,226 | B2 | 3/2014 | Parsons |
| 8,741,029 | B2 | 6/2014 | Cordatos et al. |
| 9,267,464 | B2 | 2/2016 | Ulrey et al. |
| 9,566,553 | B2 | 2/2017 | Theodore et al. |
| 9,604,837 | B2 | 3/2017 | Brown et al. |
| 10,118,109 | B1 | 11/2018 | Dyer |
| 2005/0137441 | A1 | 6/2005 | Cordatos et al. |
| 2007/0163433 | A1 | 7/2007 | Chen et al. |
| 2008/0231650 | A1 | 9/2008 | Kojima et al. |
| 2008/0257146 | A1 | 10/2008 | Spadaccini et al. |
| 2010/0030151 | A1 | 2/2010 | Kirsch |
| 2012/0186562 | A1 | 7/2012 | Achor |
| 2013/0047845 | A1 | 2/2013 | Sampath |
| 2013/0343934 | A1 | 12/2013 | Du |
| 2015/0078919 | A1 | 3/2015 | Hong et al. |
| 2015/0176715 | A1 | 6/2015 | Huang et al. |
| 2016/0136821 | A1 | 5/2016 | Vaughn |
| 2019/0060791 | A1 | 2/2019 | Dyer |
| 2019/0083905 | A1 | 3/2019 | Dyer |

FOREIGN PATENT DOCUMENTS

| | | |
|---|---|---|
| EP | 1810742 B1 | 7/2007 |
| EP | 3446982 A1 | 2/2019 |
| EP | 3456944 A1 | 3/2019 |
| FR | 2999653 A1 | 6/2014 |

OTHER PUBLICATIONS

European Search Report for Application No. 18189736,4-1010, dated Jan. 4, 2019, 8 pages.
European Search Report for Application No. 18193861.4-1007 dated Feb. 12, 2019, 6 pages.
European Office Action; International Application No. 18189721.6-1010; International Filing Date: Aug. 20, 2018; dated May 27, 2020; 5 pages.
European Office Action; International Application No. 18189736.4-1010; International Filing Date: Aug. 20, 2018; dated Jun. 9, 2020; 6 pages.
U.S. Non-Final Office Action; U.S. Appl. No. 15/683,475; Application Filing Date: Aug. 22, 2017; dated Apr. 15, 2020; 13 pages.
U.S. Final Office Action; U.S. Appl. No. 15/683,475; Application Filing Date: Aug. 22, 2017; dated Jan. 15, 2020; 16 pages.
European Search Report; 19152158.2; dated Jun. 11, 2019, 11 pages.
Non-Final Office Action; U.S. Appl. No. 15/706,078; dated Jun. 7, 2019; 7 Pages.
European Office Action; European Application No. 18193861.4; dated Nov. 11, 2021; 5 pages.
European Office Action; European Application No. 19152158.2; dated Nov. 10, 2021; 8 pages.

* cited by examiner

VALVE CONTROLLED VACUUM SYSTEM

BACKGROUND

Exemplary embodiments of this disclosure generally relate to fuel systems, and more particularly, to stabilization of fuel via deoxygenation systems.

Aircraft fuel is often utilized as a coolant for various aircraft systems. The presence of dissolved oxygen in aircraft fuel may be objectionable because the oxygen supports oxidation reactions that may yield undesirable by-products. When aerated fuel is heated above 250° F., the oxygen contained therein initiates free radical reactions resulting in deposits commonly referred to as "coke" or "coking." Coke may be detrimental to the fuel lines and may inhibit combustion. The formation of such deposits may impair the normal functioning of a fuel system, either with respect to an intended heat exchange function or the efficient injection of fuel.

BRIEF DESCRIPTION

Disclosed is a vacuum system for use with a deoxygenator system includes a housing, a movable assembly positioned within the housing, and a biasing mechanism coupling the movable assembly to the housing. The movable assembly is movable between a first position and a second position within the housing to form a low pressure area between the housing and the movable assembly. A control system including at least one pressure source is arranged in fluid communication with the low pressure area. The control system is operable to selectively communicate fluid from the at least one pressure source to the housing to form the low pressure area.

In addition to one or more of the features described above, or as an alternative, in further embodiments the control system is operable to repeatedly move the movable assembly between the first position and the second position.

In addition to one or more of the features described above, or as an alternative, in further embodiments the at least one pressure source includes a high pressure source.

In addition to one or more of the features described above, or as an alternative, in further embodiments communication of fluid from the high pressure source into the housing overcomes a biasing force of the biasing assembly.

In addition to one or more of the features described above, or as an alternative, in further embodiments the control system further comprises a controller.

In addition to one or more of the features described above, or as an alternative, in further embodiments the control system further comprises a valve operably coupled to the controller and to the at least one pressure source.

In addition to one or more of the features described above, or as an alternative, in further embodiments comprising a venting valve operable to vent oxygen from the low pressure area, the venting valve being operably coupled to the controller.

In addition to one or more of the features described above, or as an alternative, in further embodiments the control system further comprises a pressure sensor for monitoring a pressure within the low pressure area, the pressure sensor being coupled to the controller.

In addition to one or more of the features described above, or as an alternative, in further embodiments the controller is configured to open the venting valve in response to a signal from the pressure sensor indicating that a pressure of the low pressure area exceeds a predetermined threshold.

In addition to one or more of the features described above, or as an alternative, in further embodiments the low pressure area is fluidly connected to a deoxygenation system.

In addition to one or more of the features described above, or as an alternative, in further embodiments the movable assembly includes a piston.

In addition to one or more of the features described above, or as an alternative, in further embodiments the movable assembly includes a rolling diaphragm.

In addition to one or more of the features described above, or as an alternative, in further embodiments the deoxygenator system is associated with an engine of an aircraft.

Also disclosed is a method of operating a deoxygenator system includes supplying a high pressure fluid to a housing, moving a movable assembly from a first position to a second position in response to the high pressure fluid, and creating a vacuum within a chamber defined between the movable assembly and the housing.

In addition to one or more of the features described above, or as an alternative, in further embodiments supplying the high pressure fluid to the housing opposes a biasing force retaining the movable assembly in the first position.

In addition to one or more of the features described above, or as an alternative, in further embodiments moving the movable assembly from the first position to the second position creates the vacuum within the chamber defined between the movable assembly and the housing.

In addition to one or more of the features described above, or as an alternative, in further embodiments comprising: monitoring a pressure within the chamber and venting oxygen from the chamber when the pressure within the chamber exceeds a predetermined threshold.

In addition to one or more of the features described above, or as an alternative, in further embodiments comprising: ceasing the supply of the high pressure fluid to the housing and moving the movable assembly from the second position to the first position.

In addition to one or more of the features described above, or as an alternative, in further embodiments the movable assembly is repeatedly cycled between the first position and the second position.

In addition to one or more of the features described above, or as an alternative, in further embodiments oxygen is drawn from a fuel within the deoxygenator system in response to creating a vacuum within the chamber defined between the movable assembly and the housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
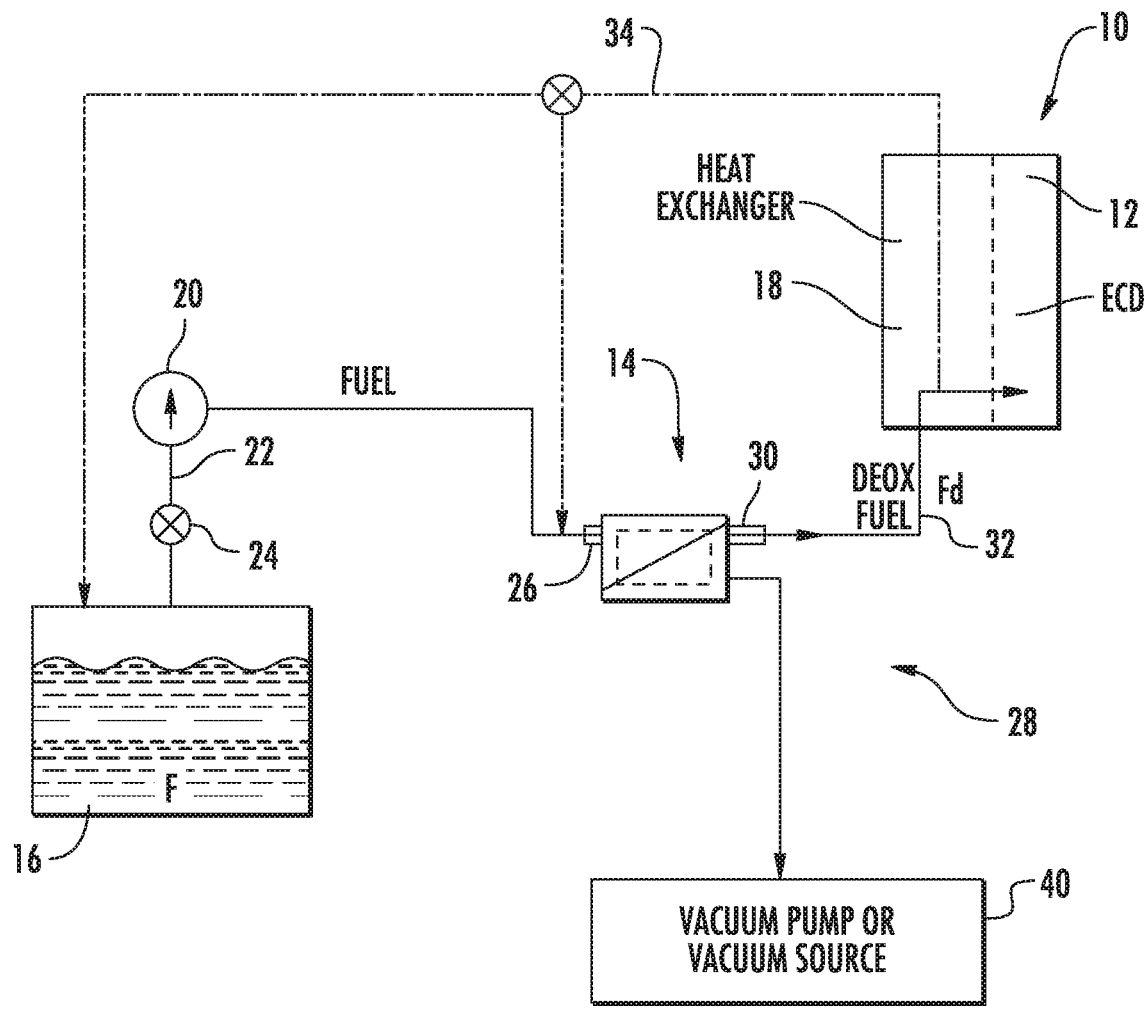
FIG. 1 is a schematic diagram of a fuel system.

Referring now to FIG. 1, an example of a schematic of a basic fuel system 10 for use with an energy conversion device 12 is illustrated. In an embodiment, the energy conversion device 12 includes a gas turbine engine, such as commonly used in vehicle including but not limited to a fixed or rotary wing aircraft for example. In embodiments where the energy conversion device 12 is an engine, the fuel configured to power the energy conversion device 12 may additionally serve as a coolant for one or more subsystems of the vehicle and becomes heated as it is delivered to the fuel injectors immediately prior to combustion.

The fuel system 10 includes a deoxygenator system 14 that receives a liquid fuel F from a reservoir 16, for example a fuel tank. The fuel F is typically a hydrocarbon, such as aircraft fuel for example. The energy conversion device 12 may exist in a variety of forms in which the fuel, at some point prior to eventual use for processing, such as combustion or some form of energy release, acquires sufficient heat to support autoxidation reactions and coking if dissolved oxygen is present in the fuel to any significant extent.

A heat exchange system 18 represents a system through which the fuel passes in a heat exchange relationship. It should be understood that the heat exchange section 18 may be directly associated with the energy conversion device 12 and/or distributed elsewhere in the larger fuel system 10. The heat exchange system 18 may alternatively or additionally include a plurality of heat exchanges distributed throughout the system 10.

As generally understood, fuel F stored in the reservoir 16 normally contains dissolved oxygen, such as at a saturation level of 70 ppm for example. However, it should be understood that a fuel having any level of dissolved oxygen is contemplated herein. A fuel pump 20 draws the fuel F from the reservoir 16. The fuel pump 20 communicates with the reservoir 16 via a fuel reservoir conduit 22 and a valve 24 to a fuel inlet 26 of the deoxygenator system 14. The pressure applied by the fuel pump 20 assists in circulating the fuel F through the deoxygenator system 14 and other portions of the fuel system 10. As the fuel F passes through the deoxygenator system 14, oxygen is selectively removed into a vacuum system 28.

The deoxygenated fuel $F_d$ flows from a fuel outlet 30 of the deoxygenator system 14 via a deoxygenated fuel conduit 32, to the heat exchange system 18 and to the ECD 12 such as the fuel injectors of a gas turbine engine. A portion of the deoxygenated fuel $F_d$ may be recirculated, as represented by recirculation conduit 34 to either the deoxygenator system 14 and/or the reservoir 16. It should be understood that although a particular component arrangement is disclosed in the illustrated embodiment, other arrangements are also considered within the scope of the disclosure.

Figure 2:
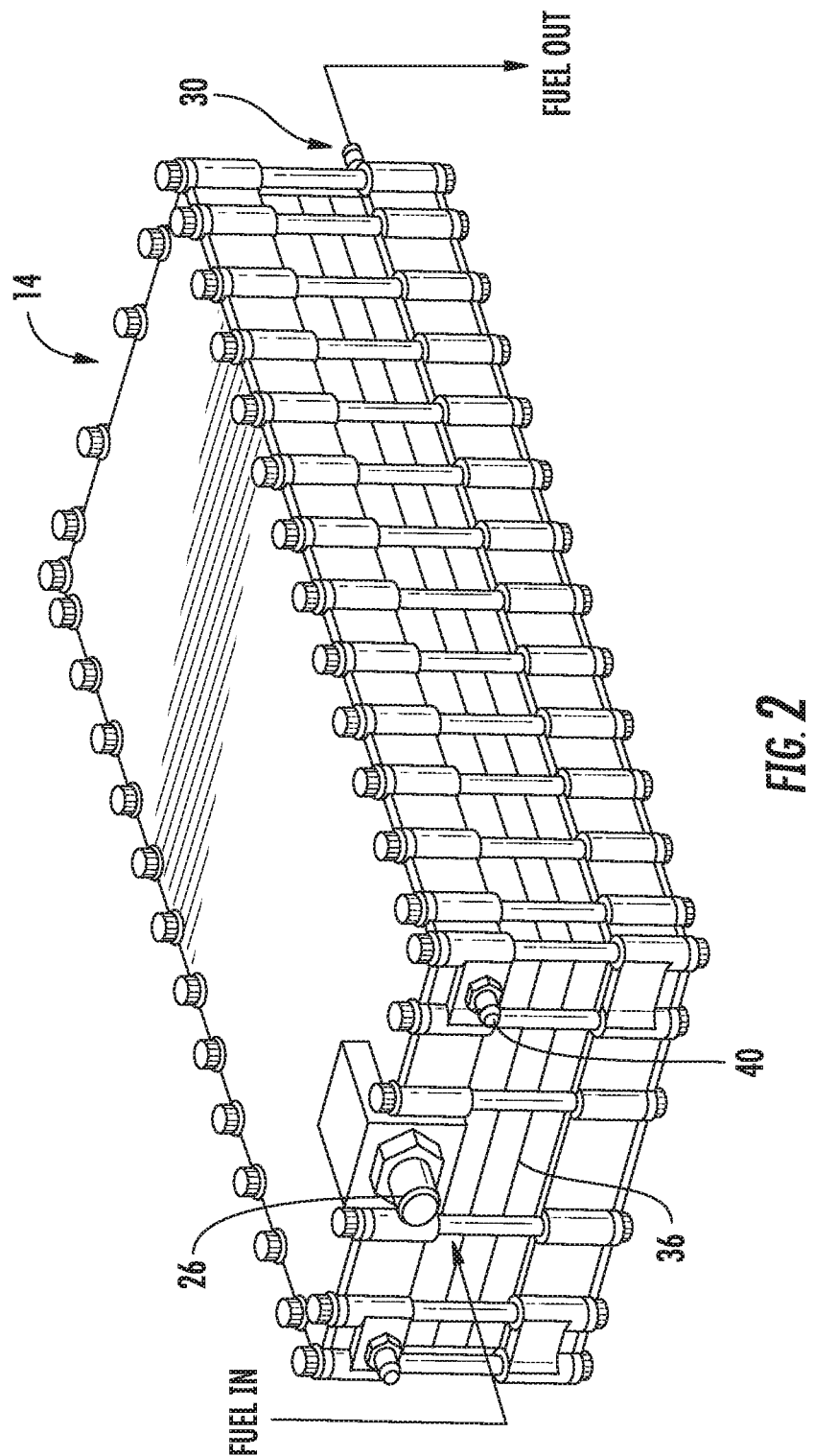
FIG. 2 is perspective view of a deoxygenator system according to an embodiment.
Figure 3:
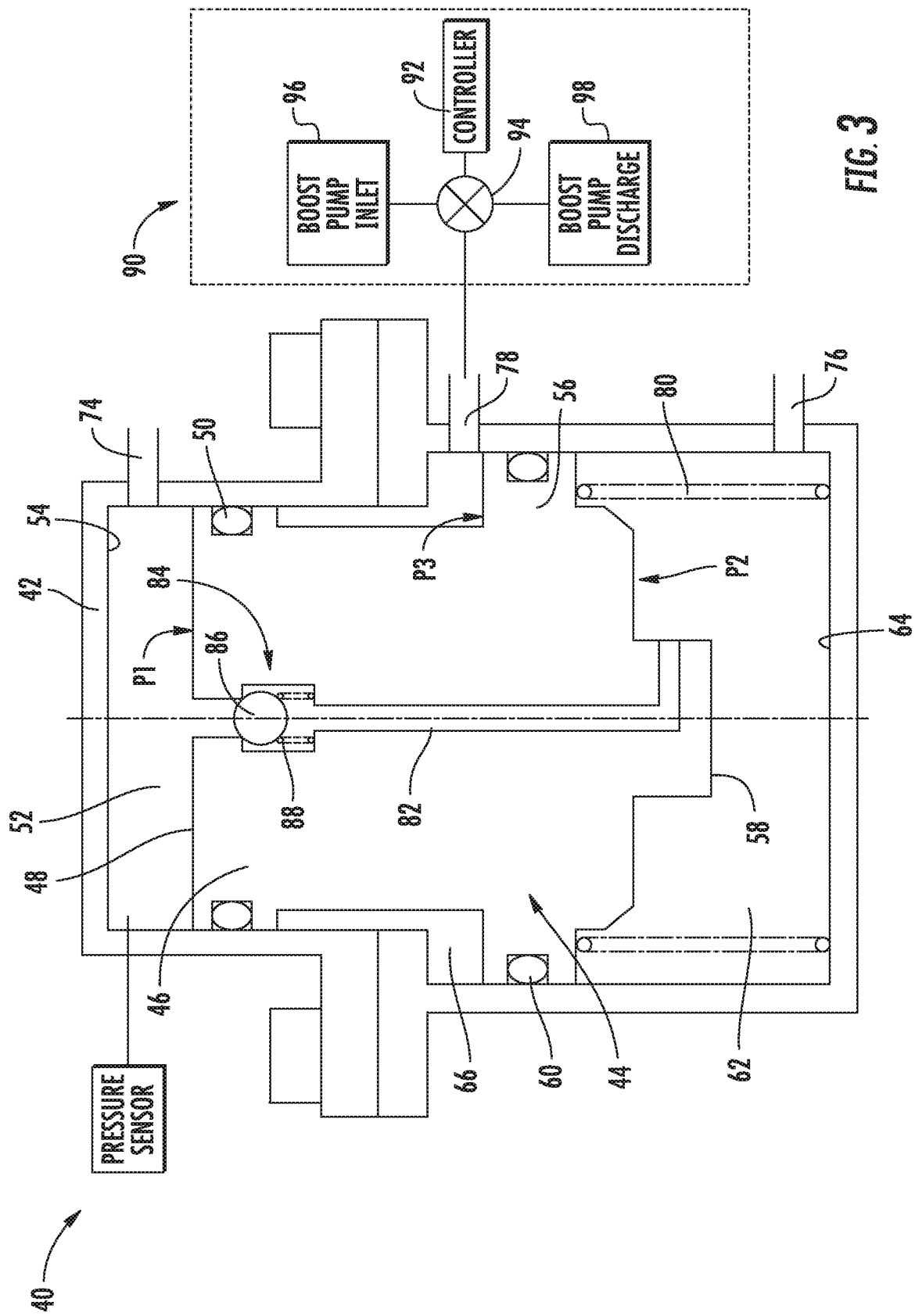
FIG. 3 is a cross-sectional diagram of a vacuum system of the fuel system according to an embodiment.

Referring to FIG. 2, in the illustrated, non-limiting embodiment, the deoxygenator system 14 includes a multiplicity of gas/fuel micro-channel assemblies 36. The assemblies 36 include a composite oxygen permeable membrane (not shown) between a fuel channel (not shown) and an oxygen receiving vacuum system 28 which permits the flow of nitrogen and/or another oxygen-free gas (FIG. 3). It should be understood that the channels may be of various shapes and arrangements to provide a pressure differential, which maintains an oxygen concentration differential across the membrane to deoxygenate the fuel. The composite oxygen permeable membrane preferably includes oxygen permeable membranes, which allow dissolved oxygen (and other gases) to diffuse through angstrom-size voids but exclude the larger fuel molecules, and permeable membranes which use a solution-diffusion mechanism to dissolve the oxygen (and/or other gases) and allow it (or them) to diffuse through the membrane, while excluding the fuel.

Figure 4:
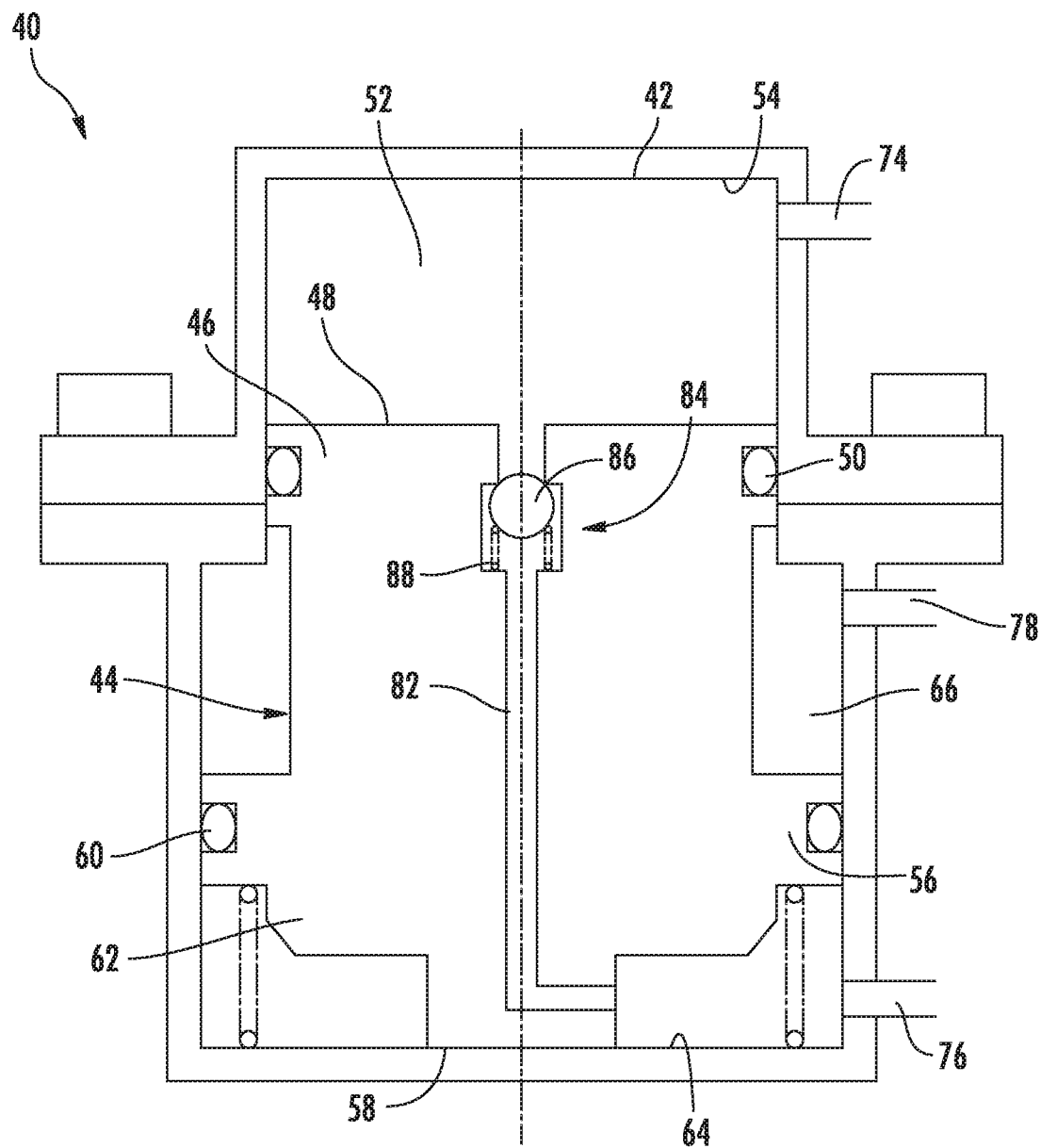
FIG. 4 is a cross-sectional diagram of another vacuum system of the fuel system according to an embodiment.
Figure 5:
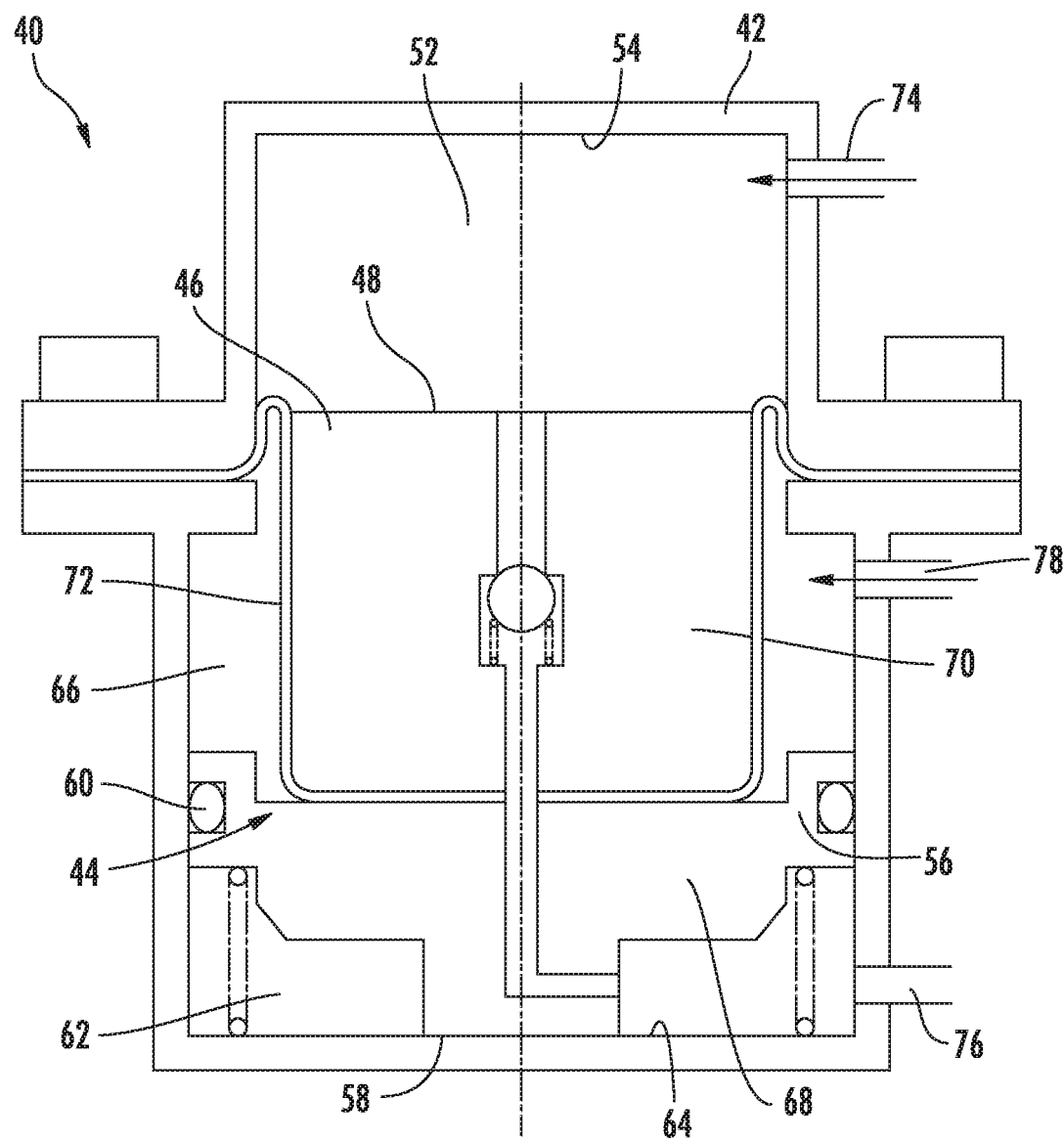
FIG. 5 is a cross-sectional diagram of a vacuum system of the fuel system according to an embodiment.

With reference now to FIGS. 3-5, an example of the oxygen receiving vacuum system 28 is illustrated in more detail. As shown, the vacuum system 28 includes an enclosure or housing 42 having a generally hollow interior within which a movable assembly 44 is located. An outer diameter at a first portion 46 of the movable assembly 44, such as near a first end 48 for example, is generally complementary to the inner diameter of the adjacent housing 42. In an embodiment, an o-ring or other suitable device 50 extends between the first portion 46 of the movable assembly 44 and the housing 42 to form a seal preventing the flow of a fluid there between. As a result, a first chamber 52 is defined within the housing 42 between a first end 54 of the housing 42 and the first portion 46 of the movable assembly 44.

A second portion 56 of the movable assembly 44, located near a second end 58 of the movable assembly 44, similarly has an outer diameter generally complementary to the inner diameter of an adjacent portion of the housing 42. An additional o-ring or sealing mechanism 60 extends between the second portion 56 of the movable assembly 44 and the housing 42 to prevent a flow of fluid there between. Accordingly, a second chamber 62 is defined within the housing 42 between a second, opposite end 64 of the housing 42 and the second portion 56 of the movable assembly 44.

The first portion 46 and the second portion 56 of the movable assembly 44 are spaced apart from one another by a distance. A third chamber 66 is formed generally within the housing 42 between the first portion 46 and the second portion 46 of the movable assembly 44. The third chamber 66 may be formed by varying an outer diameter of the movable assembly 44 between the first and second portions 46, 56 and/or by varying an inner diameter of the housing 42 between the first and second portions 46, 56.

In the illustrated, non-limiting embodiment of FIGS. 3-4, the movable assembly 44 is a piston and the first and second portions 46, 56 are integrally formed therewith. Alternatively, in the embodiment illustrated in FIG. 5, the movable assembly 44 includes a rolling diaphragm 70 coupled to a piston 68. In such embodiments, the third chamber 66 is defined between seal 72 of the diaphragm 70 and the upper surface of the piston 68.

Multiple ports are formed at various locations in the housing 42. In an embodiment, a first port 74 is disposed adjacent a first end 54 of the housing 42. The first port 74 fluidly couples the first chamber 52 to the deoxygenation system 14. A second port 76, disposed adjacent the second end 64 of the housing 42 is in fluid communication with ambient air, such as exterior to the energy conversion device 12, and in some embodiments to the vehicle. A third port 78 is arranged in fluid communication with the third chamber 66 and is associated with the fuel pump 20.

The movable assembly 44 is configured to move within the housing 42 in response to the pressure generated by the fluids communicated to each of the chambers 52, 62, 66 via ports 74, 76, 78. For example, a first pressure, indicated by arrow P1 is applied by a fluid within the first chamber 56 to the first end 48 of the movable assembly 44, a second pressure, indicated by arrow P2 is applied by the ambient air to the second portion 56 of the movable assembly 44, and a third pressure, indicated by arrow P3, is applied by the exhaust from the fuel pump 20 within the third chamber 66 to a portion of the movable assembly 44 between the first portion 46 and the second portion 56. In an embodiment, a biasing mechanism 80, such as a coil spring for example, couples the second end 58 of the movable assembly 44 to an adjacent surface 64 of the housing 42. The biasing force of the biasing mechanism 80 is configured to bias the movable assembly 44 towards a first position, such as shown in FIG. 3 for example.

The fluid communicated to the interior of the housing 42 through each of the plurality of ports 74, 76, 78 is dependent on a mode of operation of the vehicle. For example, when an aircraft is grounded and the energy conversion device 12 is non-operational, or is operating in a reduced mode, the pressure P2 generated by the ambient air is greater than the combination of the pressure P3 of the fuel pump 20 and the pressure P1 of the fluid within the first chamber 52. As a result, the biasing mechanism 80 biases the movable assembly 44 to the first position.

When the energy conversion device 12 is operational, for example when the aircraft is in a flight condition where the ambient air pressure is substantially reduced, such as when the aircraft is cruising at altitude, the pressure P2 generated by operation of the fuel pump 20 is greater than the pressure P3 of the ambient air. As a result, pressure P2 overcomes the biasing force of the biasing mechanism 80, causing the movable assembly 44 to transition within the housing 42 towards a second position, shown in FIG. 4. As the movable assembly 44 slides within the housing, such as along an axis for example, a vacuum is created within the first chamber 52. This vacuum is applied via port 74 to the deoxygenator system 14 causing the first chamber 52 to fill with oxygen evacuated from the fuel within the deoxygenator system 14.

A fluid flow path 82 fluidly couples the first chamber 52 and the second chamber 62. A valve 84 is disposed within the fluid flow path 82 and is operable to selectively expel the evacuated oxygen from the first chamber 52. In the illustrated, non-limiting embodiment, the valve 84 includes a sealing member 86 biased into a first position to block a flow through the flow path. When the pressure within the first chamber 52 exceeds a threshold, the pressure will oppose the biasing force of the biasing member 88 of the valve 84, causing the sealing member 86 to move to a second position. In the second position, oxygen is able to flow through fluid flow path 82. Further, because of the low pressure within the second chamber 62, the fluid is drawn there into and then expelled into the atmosphere by movement of the aircraft. Alternatively, or in addition, the valve 84 may be selectively opened, such as via a solenoid for example, to allow oxygen to be removed from the first chamber 52 on demand. In an embodiment, the valve 84 is operated during the descent and/or landing of the aircraft.

With reference again to FIG. 3, the vacuum system 28 may additionally include a control system 90 for operating the vacuum system 28, i.e. moving the movable assembly 44 on demand, such as in response to a signal generated by a controller 92. The signal generated by the controller 92 may occur in response to an input provided by an operator or other system, or alternatively, may be generated on a pre-determined schedule. As shown, the control system 90 further includes a solenoid valve 94 operably coupled to a controller 92 and configured to supply either a low pressure fluid, such as from a boost pump inlet 96 for example, or a high pressure fluid, such as from a boost pump outlet 98 for example, into the third chamber 66 of the vacuum system 28. When no fluid or a low pressure fluid is provided to the third chamber 66, the biasing mechanism 80 acting on the movable assembly 44 biases the movable assembly 44 toward the first position.

In response to the signal generated by the controller 92, the valve 94 may transition to a position where a supply of the higher pressure fluid is provided to the third chamber 66. The combined pressure of the first and third chambers 52, 66 causes the movable assembly 44 to translate within the housing 42 toward the second position. As the movable assembly 44 moves, a vacuum is created and drawn over the plurality of membranes in the deoxygenator system 14, and the extracted oxygen fills the first chamber 52. As the oxygen collects within the first chamber 52, the pressure of the first chamber 52 gradually increases. A pressure sensor 99 configured to monitor the pressure within the first chamber 52 will communicate a signal to a controller 92. Once the sensed pressure exceeds a predetermined threshold, the controller 92 will operate the valve 84, thereby allowing the oxygen within the first chamber 52 to transfer to the second chamber 62. In an embodiment, once the oxygen has transferred to the second chamber 62, the controller 92 operates the valve 94 such that no fluid or the lower pressure fluid is supplied to the third chamber 66. As a result of the change in pressure, the movable assembly 44 will transition from the second position to the first position. Accordingly, valve 94 can be operated to control generation of a vacuum and the expulsion of oxygen from a chamber 52. By repeatedly drawing oxygen from the deoxygenator system 14 at intervals via controlled operation of valve 94, the overall size of the vacuum system 28, and specifically the size of the first chamber 52 may be reduced. Further, in some embodiments, oxygen within the second chamber 62 may be be forced out of the housing 42 through the second port 76 as the movable assembly 44 transitions between the first position and the second position.

With reference now to FIGS. 6A-6C, and 7, another example of a deoxygenator system 14 is shown. In the illustrated, non-limiting embodiment, the vacuum system 28 is integrated directly into the deoxygenator system 14. As shown, the deoxygenator system 14 includes a first housing 100, a second housing 102, a third housing 104, a movable assembly 106, an outlet cap 108, an end cap 110, and a valve assembly 112. The first housing 100, the second housing 102, the third housing 104, the movable assembly 106, the outlet cap 108, and the end cap 110 are disposed concentrically with each other. The integration of the above identified components into a single unit may eliminate plumbing lines that connect the individual elements of the deoxygenator system 14 as well as to reduce the overall size of the deoxygenator system 14.

The first housing 100 extends along a first axis 114 between a first housing first end 116 and a first housing second end 118. The first housing first end 116 is provided with a first inner diameter and the first housing second end 118 is provided with a second inner diameter that is less than the first inner diameter. An inner surface of the first housing 100 is configured as a tapered surface having a taper that extends inwardly from the first housing first end 116 towards the first housing second end 116.

The first housing 100 defines a support rib 120 that extends from the first housing second end 118 towards the first housing first end 116. The first housing 100 further defines a first plurality of holes 122 and a second plurality of holes 124 that are disposed transverse to the first axis 114.

The first plurality of holes 122 extend between the first housing first end 116 and the first housing second end 118.

The first housing 100 may be arranged as a fuel filter housing that receives a fuel filter 126. The fuel filter 126 includes sealing elements that engage the inner surface of the first housing 100. The fuel filter 126 is arranged to receive fuel along the first axis 114, turn the fuel, and enable the fuel to exit or be discharged in a direction that is disposed transverse to the first axis 114 and through the first plurality of holes 122 of the first housing 100 towards the second housing 102.

The second housing 102 is disposed about and is spaced apart from the first housing 100. The second housing 102 extends along the first axis 114 between a second housing first end 130 and the second housing second end 132. The second housing 102 includes a skirt 134 that is disposed proximate the second housing first end 130 and radially extends away from the first axis 114 towards the third housing 104. The skirt 134 includes a sealing element that slidably engages the third housing 104. The second housing second end 132 is configured as an open end.

A membrane filter 140 is disposed between the first housing 100 and the second housing 102. The membrane filter 140 includes a tube bundle or a plurality of hollow tubes 142 that extend along the first axis 114 between a first membrane end 144 and a second membrane end 146. The plurality of hollow tubes 142 are formed into a hollow cylindrical shaped bundle that are supported by potting or an epoxy 148 at the first membrane end 144 and at the second membrane end 146. The potting or epoxy 148 adheres the plurality of hollow tubes 142 together but allows the first membrane end 144 and the second membrane end 146 to be open to be subject to the vacuum generated by the movable assembly 106.

Figure 6A:
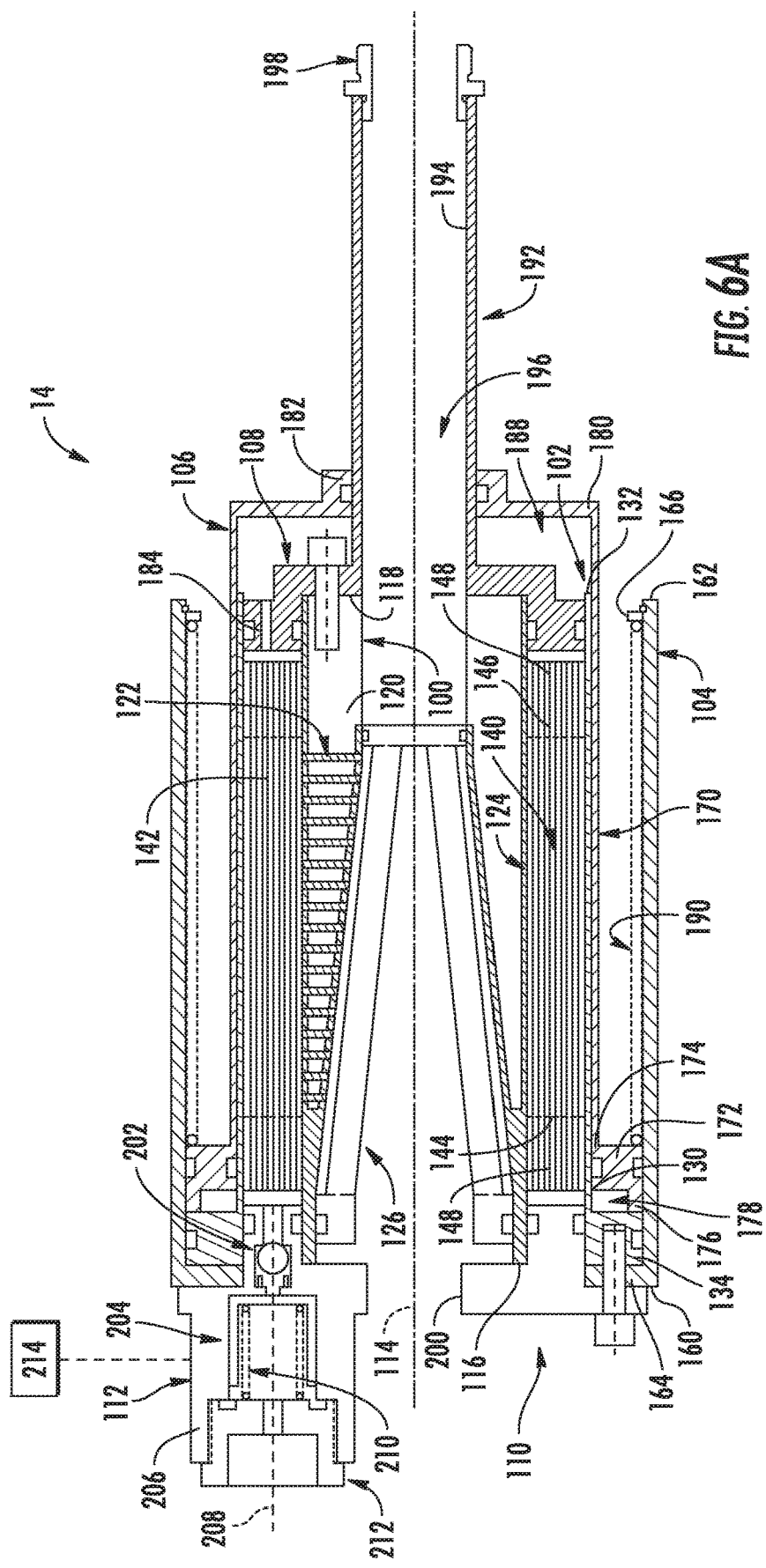
FIG. 6A is a cross sectional view of a deoxygenator system in a first position according to an embodiment.
Figure 6C:
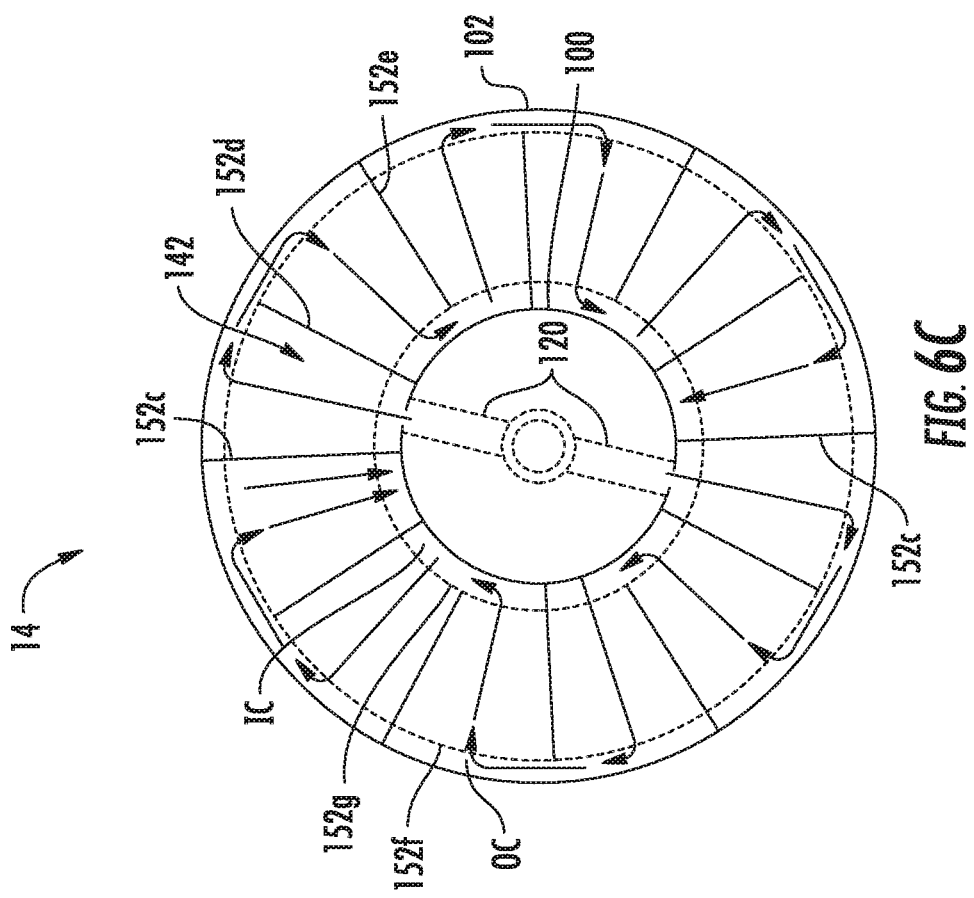
FIG. 6C is an end view of a deoxygenator system according to another embodiment.
Figure 6B:
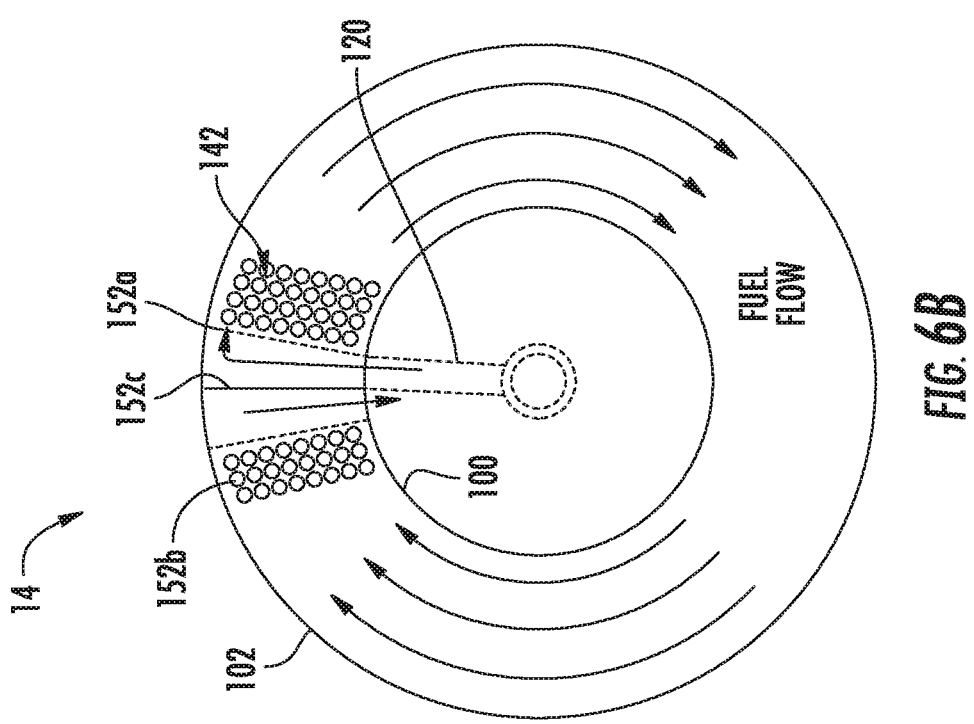
FIG. 6B is an end view of a deoxygenator system according to an embodiment.

Referring to FIGS. 6A-6C, the plurality of hollow tubes 142 are selectively permeable membrane tubes that are disposed within a first flow circuit that is defined between the first housing 100 and the second housing 102. The plurality of hollow tubes 142 are disposed at least partially about a circumference of the first housing 100 that includes multiple holes that are axially spaced apart along a length of the membrane filter 140. The multiple holes ensure a uniform fuel flow through the plurality of hollow tubes 142 to maximize the efficiency of each tube. Fuel flows radially through the first plurality of holes 122 of the first housing 100 and flows over the plurality of hollow tubes 142 of the membrane filter 140. As the fuel passes over the plurality of hollow tubes 142 of the membrane filter 140, oxygen is drawn from the fuel through the membrane filter 140 and into the center of each tube of the plurality of hollow tubes 142. A second flow circuit fluidly communicates with an inner channel or center of the tubes of the plurality of hollow tubes 142 such that a vacuum draws or carries away oxygen that is pulled from the fuel that flows around the plurality of hollow tubes 142 of the membrane filter 140 and is within the inner channel of center of a tube of the plurality of hollow tubes 142. The center of a tube of the plurality of hollow tubes 142 is partially isolated from the first flow circuit such that the vacuum does not pass through a wall of a tube of the plurality of hollow tubes 142. The fuel flows across or over the plurality of hollow tubes 142 of the membrane filter 80 and exits the membrane filter 140 through the second plurality of holes 124 of the first housing 100 and then is turned to flow axially towards an outlet of the oxygen removal system 10.

In the embodiment shown in FIG. 6B, the plurality of hollow tubes 142 may be disposed between the first housing 100 and the second housing 102 and may at least partially disposed about a circumference of the first housing 100. The support rib 120 may at least partially define the first plurality of holes 122 and a plurality of holes 150. A first grate 152a may be disposed between an opening to the first flow circuit and the plurality of hollow tubes 142 and a second grate 152b may be disposed between an opening to the second flow circuit and the plurality of hollow tubes 142. A divider wall 152c may extend between the first housing 100 and the second housing 102 that prevents flow from short circuiting from the inlet to the outlet such that fuel is forced to flow around the entire circumference of the first housing 100 and through the plurality of hollow tubes 142 of the membrane filter 140.

The flow may pass over an outside surface of a tube of the plurality of hollow tubes 142 as the flow travels circumferentially, as shown in FIG. 6B, while a flow that passes through the inner channel of a tube of the plurality of hollow tubes 142 may be drawn out through the second flow circuit.

In the embodiment shown in FIG. 6C, a first wall 152d and a second wall 152e are disposed between the first housing 100 and the second housing 102 to cause flow within the first flow path to move radially outward and inward as the flow flows around the circumference of the first housing 100. For example, the first wall 152d and the second wall 152e may define a labyrinth path such that the first wall 152d extends from the first housing 100 towards but does not reach the second housing 102 and the second wall 152e extends from the second housing 102 towards but does not reach the first housing 100.

An inner grate 152f may overlay one or more inner pass through channels, IC, between each wall pair 152d, 152e. An outer grate 152g may overlay one or more outer pass through channels, OC, between each wall pair 152d, 152e. The plurality of hollow tubes 142 of the membrane filter 140 may be disposed between the inner grate 152f and the outer grate 152g such that flow is radial through each tube section of the plurality of hollow tubes 142.

The flow may travel radially outward through each section of tubes of the plurality of hollow tubes 142 into the outer pass through channels, OC, where the flow may travel circumferentially to the next section of tubes where the flow travels radially inward to the inner pass through channels, IC.

The third housing 104 is disposed about the second housing 102 and the movable assembly 106. The third housing 104 extends along the first axis 114 between a third housing first end 160 and a third housing second end 162. The third housing 104 has a first flange 164 that is disposed proximate the third housing first end 160 and extends towards the first housing 100 and the first axis 114. The first flange 164 engages the skirt 134 of the second housing 102. The first flange 164 facilitates securing the third housing first end 160 to the second housing first end 130. The third housing 104 has a second flange 166 that is disposed proximate the third housing second end 162 and extends towards the first housing 100, the movable assembly 106, and the first axis 114.

The movable assembly 106 is at least partially disposed about the second housing 102 and is disposed between the second housing 102 and the third housing 104. The movable assembly 106 includes a piston housing 100. The piston housing 170 extends along the first axis 114 between a piston housing first end 102 and a piston housing second end 104.

The housing 170 of the movable assembly 106 includes a piston skirt 172 that is disposed proximate the housing first end 174 and radially extends towards the third housing 104.

The piston skirt 172 includes an extension or a spacer 176 that extends axially towards the skirt 134 of the second housing 102. The combination of the skirt 134 of the second housing 102, the spacer 176, and the piston skirt 172 of the housing 170 define a first chamber 178. The first chamber 178 is arranged to receive oxygen that is removed from the fuel by the membrane filter 140. The second end 180 of the housing 170 of the movable assembly 106 defines an opening 182 that is disposed about the first axis 114. A cavity 188 is defined by the housing second end 180, the first housing second end 118, and the second housing second end 132.

A biasing member 190 extends between the second flange 166 of the third housing 104 and the piston skirt 172 of the housing 170 of the movable assembly. The biasing member 190 is arranged to bias the housing 170 towards a first position in which the housing first end 174 approximately abuts the second housing first end 130.

Figure 7:
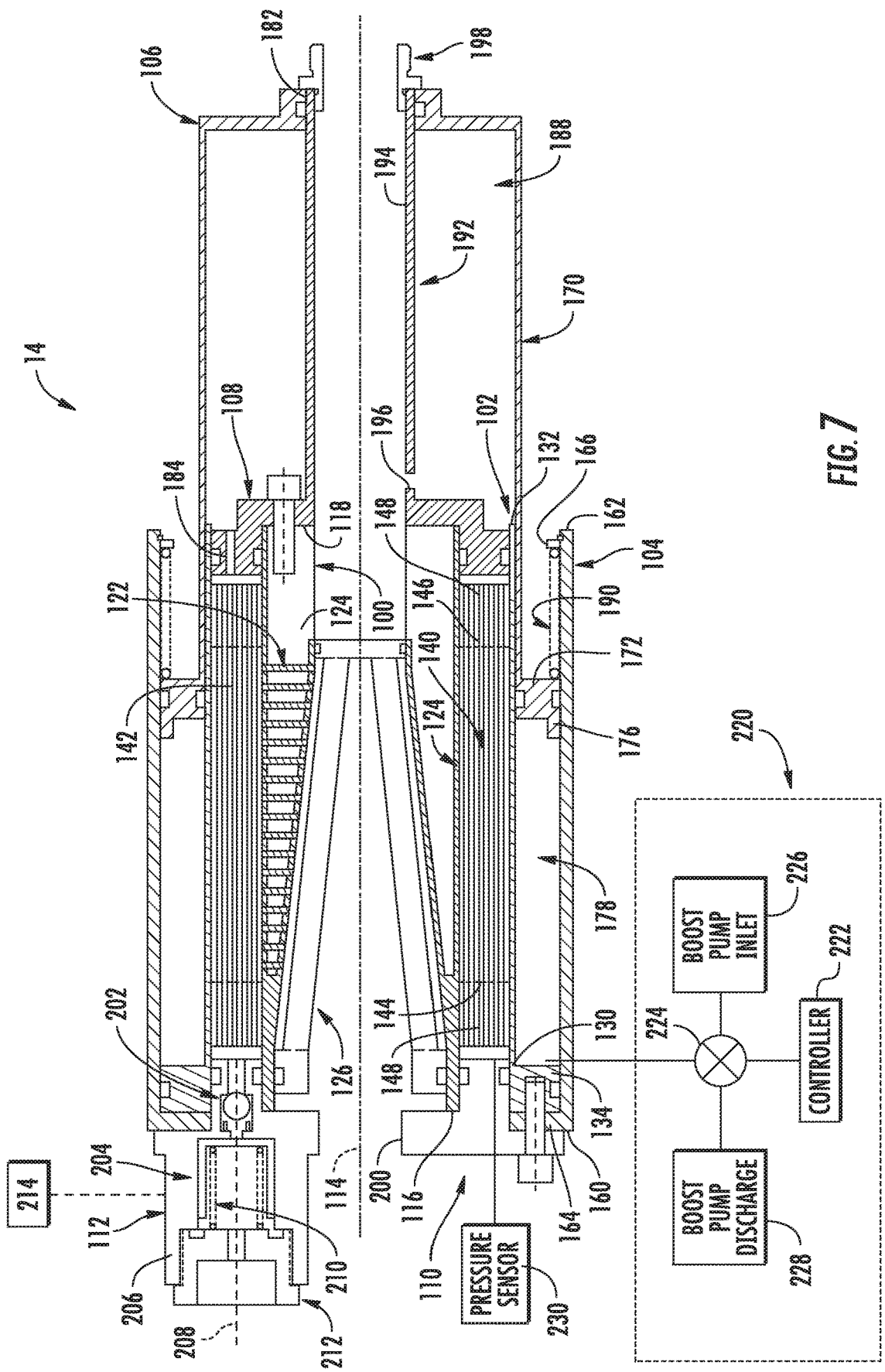
FIG. 7 is a cross-sectional view of a deoxygenator system in a second position according to an embodiment.

The housing 170 of the movable assembly 106 is movable between a first position, as shown in FIG. 6A and a second position, as shown in FIG. 7, relative to the first housing 100, the fuel filter 126, the second housing 102, the membrane filter 140, and the third housing 104. The spacer 176 of the piston skirt 172 of the housing 170 engages the skirt 134 of the second housing 102 while the housing 170 of the movable assembly 106 is in the first position, and pressurized fuel is not provided to the deoxygenator system 14. As pressurized fuel enters the deoxygenator system 14, the pressure acting on the deoxygenator system 14 overcomes the force provided by the biasing member 190 and moves the housing 170 of the movable assembly 106 towards the second position. The housing first end 174 is spaced apart from the second housing first end 130 such that the spacer 176 of the piston skirt 172 does not engage the skirt 134 of the second housing 102 while the housing 170 of the movable assembly 106 is in the second position. As the housing 170 moves towards the second position, a vacuum is created to draw the oxygen from within the tubes 142 of the membrane filter 140 and is directed towards the cavity 188.

The outlet cap 108 is disposed within the cavity 188 and is disposed opposite the end cap 110. The outlet cap 108 is at least partially disposed between the first housing 100 and the second housing 102. The outlet cap 108 abuts and is secured to the first housing second end 118. A fastener extends through the outlet cap 108 and into the support rib 120 to secure the outlet cap 108 to the first housing 100. The outlet cap 108 defines a port 184 that is fluidly connected to the cavity 188.

The outlet cap 108 includes an extension member 192 that extends along the first axis 114 from a portion of the outlet cap 108 through the opening 182 of the housing 170 of the movable assembly 106. The housing 170 is arranged to ride along or slidably engage the extension member 192 as the housing 170 moves between the first position and the second position.

The extension member 192 is configured as a hollow member that defines a fluid outlet 194 that extends along the first axis 114. The fluid outlet 194 is arranged to discharge fuel axially along the first axis 114 such that the fuel may be delivered to other systems. In at least one embodiment, a cap 198 is disposed proximate an end of the extension member 192. The cap 198 extends at least partially into the extension member 192 and includes a portion that is disposed transverse to and abuts an end of the extension member 192.

The end cap 110 is disposed opposite the outlet cap 108. The end cap 110 is disposed proximate the first housing first end 116, the second housing first end 130, and the third housing first end 160. The end cap 110 abuts the first flange 164 and is arranged to receive a fastener that extends through the first flange 164 and into the skirt 134 of the second housing 102 to secure the end cap 110 to the third housing 104 and the second housing 102.

The end cap 110 defines a fuel inlet 200 that is disposed about the first axis 114. The fuel inlet 200 is arranged to receive fuel axially along the first axis 114 such that it enters into the deoxygenator system 14. The end cap 110 extends into a region that is disposed between the first housing 100 and the second housing 102. The end cap 110 is arranged to receive the valve assembly 112. The valve assembly 112 is operatively connected to the end cap 110 and extends towards the membrane filter 140 within the region that is disposed between the first housing 100 and the second housing 102.

The valve assembly 112 includes a first valve 202 and a second valve 204 that are disposed within a valve body 206 that extends through the end cap 110 and extends into the first flow circuit that is defined between the first housing 100 and the second housing 102 such that the valve body 170 extends towards an end of the membrane filter 140. The first valve 202 and the second valve 204 are arranged axially along a second axis 208 that is disposed substantially parallel to the first axis 114. The first valve 202 is configured as a check valve that is fluidly connected to the first chamber 178 that collects oxygen that is purged from the membrane filter 140. As oxygen is removed from the fuel and is collected within the first chamber 178, the first valve 202 may open and vent the removed oxygen to ambient around the second valve 204.

The second valve 204 is fluidly connected to the first valve 202. The second valve 204 is configured as a leakage protection valve. The second valve 204 allows oxygen to pass through the second valves diametrical clearance, but the second valve 204 may translate along the second axis 208 to compress a biasing member 210 should the first chamber 178 become pressurized due to fuel entering the first chamber 178 or the first chamber 178 exceeding a predetermined pressure. As the biasing member 208 is compressed, the second valve 204 moves towards a leakage inhibit position in which the second valve 204 engages a seal 212. The seal 212 is at least partially received within the valve body 206 that contains both the first valve 202 and the second valve 204. The second valve 204 may be arranged in communication with a sensor or a switch 214 that is in communication with a controller. A message is output for display by the controller, responsive to the second valve 204 engaging the seal 212.

With further reference again to FIG. 7, the deoxygenator system 14 may additionally include a control system 220 for moving the movable assembly 106 on demand, such as in response to a signal generated by a controller 222. As shown, the control system 220 further includes a solenoid valve 224 operably coupled to the controller 222 and configured to supply either a low pressure fluid, such as from a boost pump inlet 226 for example, or a high pressure fluid, such as from a boost pump outlet 228 for example, into the chamber 178. When no fluid or a low pressure fluid is provided to the chamber 178, the biasing mechanism 190 acting on the movable assembly 106 biases the movable assembly 106 toward the first position.

In response to the signal generated by the controller 222, the valve 224 may transition to a position where a supply of the higher pressure fluid is provided to the chamber 178. The increased pressure within the chamber 178 may overcome the biasing force of the biasing mechanism 190 causing the movable assembly 106 to translate toward the second position. As the movable assembly 106 moves, a vacuum is created and drawn over the plurality of tubes 142, and the extracted oxygen fills the chamber 178. As the oxygen collects within the chamber 178, the pressure of the chamber 178 gradually increases. A pressure sensor 230 configured to monitor the pressure within the chamber 178 will communicate a signal to a controller 222. Once the sensed pressure exceeds a predetermined threshold, the controller 222 will operate the first valve 202, thereby allowing the oxygen within the chamber 178 to vent outside the deoxygenator system 14. In an embodiment, once the oxygen has vented from the chamber 178, the controller 222 operates the valve 224 such that no fluid or the lower pressure fluid is supplied to the chamber 178. As a result of the change in pressure, the movable assembly 106 will transition from the second position back towards the first position. Accordingly, the control system 220 can be operated to control generation of a vacuum via valve 224 and the expulsion of oxygen from a chamber 178 via valve 202. By repeatedly drawing oxygen from the fuel provided to the deoxygenator system 14 at intervals controlled by operation of valve 224, the overall size of the deoxygenator system 14, and specifically the size of the chamber 178 may be reduced.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vacuum system for use with a deoxygenator system comprising:
    a housing;
    a movable assembly positioned within the housing;
    a biasing mechanism coupling the movable assembly to the housing, wherein the movable assembly is movable between a first position and a second position within the housing to form a first pressure area and a second pressure area between the housing and the movable assembly;
    a fluid flow path extends between and fluidly couples the first pressure area and the second pressure area, and a venting valve is arranged within the fluid flow path, the venting valve being movable between an open position and a closed position; and
    a control system including:
        a first pressure source;
        a second pressure source arranged in fluid communication with the first pressure area, the first pressure source being separate from the second pressure source;
        a valve movable between a plurality of positions to selectively deliver fluid from one of the first pressure source and the second pressure source to the housing, wherein fluid provided from the first pressure source has a lower pressure than fluid provided from the second pressure source;
        a pressure sensor operable to monitor a pressure within the first pressure area; and
        a controller operably coupled to the venting valve, the valve, and the pressure sensor, wherein the controller is configured to open the venting valve when the pressure within the first pressure area detected by the pressure sensor exceeds a threshold.

2. The vacuum system of claim 1, wherein the control system is operable to repeatedly move the movable assembly between the first position and the second position.

3. The vacuum system of claim 1, wherein communication of fluid from the first pressure source into the housing overcomes a biasing force of the biasing mechanism.

4. The vacuum system of claim 1, wherein the control system further comprises a controller, the controller being operably coupled to the valve and to the first pressure source and the second pressure source.

5. The vacuum system of claim 1, wherein the first pressure area is fluidly connected to a deoxygenation system.

6. The vacuum system of claim 1, wherein the movable assembly includes a piston.

7. The vacuum system of claim 1, wherein the movable assembly includes a rolling diaphragm.

8. The vacuum system of claim 1, wherein the deoxygenator system is associated with an engine of an aircraft.

9. A method of operating the vacuum system for use with a deoxygenator system recited in claim 1, the method comprising:
    supplying a high pressure fluid to the housing;
    moving the movable assembly from the first position to the second position in response to the high pressure fluid; and
    creating a vacuum within a chamber defined between the movable assembly and the housing.

10. The method of claim 9, wherein supplying the high pressure fluid to the housing opposes a biasing force retaining the movable assembly in the first position.

11. The method of claim 9, wherein moving the movable assembly from the first position to the second position creates the vacuum within the chamber defined between the movable assembly and the housing.

12. The method of claim 9, further comprising:
    monitoring a pressure within the chamber; and
    venting oxygen from the chamber when the pressure within the chamber exceeds a predetermined threshold.

13. The method of claim 12, further comprising:
    ceasing the supply of the high pressure fluid to the housing; and
    moving the movable assembly from the second position to the first position.

14. The method of claim 12, wherein the movable assembly is repeatedly cycled between the first position and the second position.

15. The method of claim 9, wherein oxygen is drawn from a fuel within the deoxygenator system in response to creating the vacuum within the chamber defined between the movable assembly and the housing.

* * * * *